July 3, 1928.
W. L. LEWIS
1,675,940
ART OF DISPERSING NOXIOUS MATERIALS
Filed Dec. 19, 1921
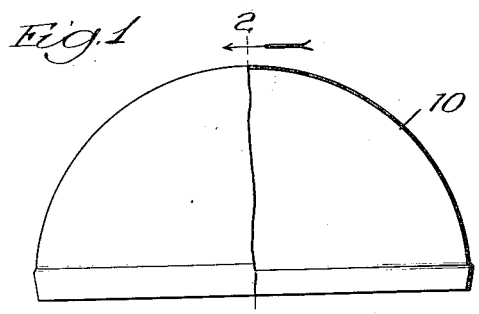
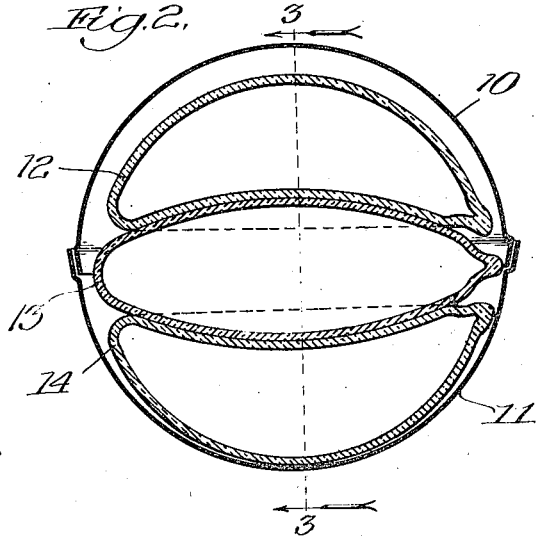
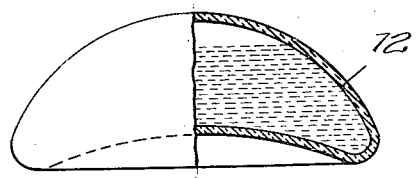
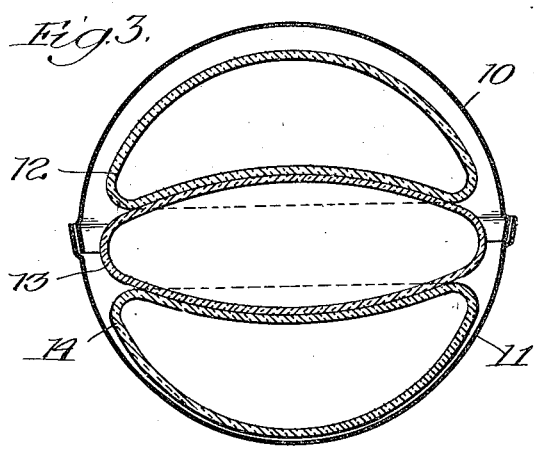
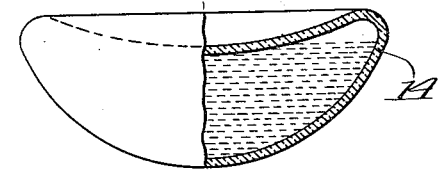
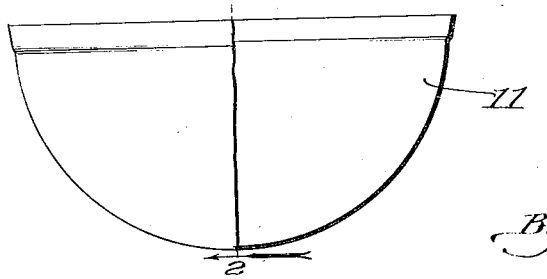
Inventor:
Winford Lee Lewis,
By Dyrenforth, Lee, Chritton & Wiles,
Attys.

Patented July 3, 1928.

1,675,940

UNITED STATES PATENT OFFICE.

WINFORD LEE LEWIS, OF EVANSTON, ILLINOIS.

ART OF DISPERSING NOXIOUS MATERIALS.

Application filed December 19, 1921. Serial No. 523,384.

This invention relates to improvements in the art of dispersing noxious materials, and will be fully understood from the following description thereof, illustrated by the accompanying drawings, in which:

Figure 1 is a view partly in section, and partly in elevation of the parts of a bomb showing the same separated;

Fig. 2 is a view taken as indicated by the line 2 of Fig. 1, showing the parts assembled to form the bomb; and Fig. 3 is a view taken as indicated by the line 3 of Fig. 2.

My invention is especially useful, for example, in warfare, police work, safe protection; and the like, where it is desired to disperse noxious materials, such as poisonous or irritating gases or fumes, in order to stop or repel attacks, disperse mobs, prevent burglars from entering safes, cause criminals to vacate barricaded houses, and similar purposes. The dispersion of noxious materials by the use of my invention is not attended by detonation, explosion, report, or flame, thus making its use especially desirable in police work, and similar cases, where a fire risk is to be avoided, and a detonation or report might be undesirable.

The noxious gas producing material may suitably be chlorpicrin, although other noxious gas or fume producing materials, such as brompicrin, brombenzylcyanide, bromacetone, butyl mercaptan, bromethyl ether, acrolein, chloracetophenone, or the like, may be employed.

In carrying out my invention, I effect the dispersion of the noxious gas producing liquid by bringing it into the zone of reaction of compounds capable of reacting exothermally without explosion or detonation, which compounds are maintained separated up to the moments at which the dispersion of the noxious gas producing material is desired. It is preferable that the noxious material be likewise maintained separate from the reacting chemicals, although it is readily apparent that if either of them is inert with respect to the noxious material, it may be admixed therewith.

The exothermally reacting compounds are, as hereinbefore stated, preferably materials which react without explosion or detonation. As compounds suitable for use in this connection, stannic chloride and an aqueous solution of ammonia may be employed. Instead of stannic chloride, silicon tetrachloride or titanium tetrachloride may be employed. Other reacting chemicals suitable for use in the present invention are, for example, chlorosulfonic acid and saturated sodium carbonate solution or liquid sulfur trioxide and concentrated ammonia solution. The use of stannic chloride, or equivalent material, and an aqueous solution of ammonium hydroxid has been found particularly desirable by reason of the evolution of ammonium chloride vapors and fumes of a tin compound which is apparently metastannic acid, without excessive evolution of heat.

It has been found advisable, in connection with the use of compounds of the nature of chlorpicrin, to introduce into the reaction zone a heat absorbent material to control the evolution of heat and prevent flame and combustion of the noxious material. For example, ammonium chloride may be introduced into the reaction zone, the ammonium chloride being preferably admixed with, or dissolved in, one of the reacting compounds. Other materials having the capacity of readily absorbing heat by their readiness to endothermic, physical or chemical change may likewise be used, for example, ammonium carbonate, etc. Ammonium chloride has the advantage of increasing fume formation on admixture of the exothermally reacting compounds. It is readily apparent that the exothermally reacting compounds may be admixed in the absence of the noxious material to form fumes.

As a specific illustration of my invention, using chlorpicrin as the noxious gas producing material, I may employ, upon one hand, fuming stannic chloride, and upon the other hand, concentrated aqueous ammonia diluted with an equal volume of water and saturated with ammonium chloride, equal volumes of each of the reacting chemicals being employed. The exothermally reacting materials are placed in separate containers and the chlorpicrin, the volume of which is equal to the volume of each of the reacting chemicals, in a third container, the three containers being so arranged that the three materials may be admixed when desired by opening or breaking the containers.

This may be accomplished, for example, by means of a bomb, or police hand grenade, such as that shown in said drawings. This bomb comprises a spherical metal shell formed of the two halves 10 and 11, having coacting edges adapted to be fitted one within the other, as shown in Fig. 2. Within the shell are placed three receptacles or containers of frangible material, such as thin glass, indicated respectively by 12, 13 and 14. These receptacles are made in suitable shapes, as shown, adapting them to nest together within the metal shell. One of these receptacles, for example 12, contains a quantity of chlorpicrin, receptacle 13, an approximately equal quantity of stannic chloride, and receptacle 14, an approximately equal quantity of diluted ammonium hydroxide solution saturated with ammonium chloride. The bomb may be thrown into the vicinity where the noxious gases or fumes are to be dispersed. Upon striking any hard substance, the three receptacles 12, 13 and 14 will break, permitting the three liquids to mix. The two halves 10 and 11 of the metal shell will become separated by the shock when the bomb strikes, or, if not, the expansion of gases within, resulting from the mixture of the liquids, will cause their separation.

The term "dispersion" as used herein is intended to include any spreading or scattering of material, in solid, liquid, vapor or gaseous form.

Although the present invention has been described in connection with the specific details of an embodiment thereof, it is not intended that these details shall be regarded as limitations upon the scope of the invention, except in so far as included in the accompanying claims.

I claim:

1. The method of dispersing noxious material which comprises bringing together stannic chloride and an aqueous solution of ammonia and introducing the noxious material into the reaction zone.

2. The method of dispersing noxious material which comprises bringing together stannic chloride and an aqueous solution of ammonia and introducing the noxious material and a heat absorbent into the reaction zone.

3. The method of dispersing noxious material which comprises bringing together fuming stannic chloride and an aqueous solution of ammonia, previously saturated with ammonium chloride, and introducing the noxious material into the reaction zone.

4. The method of producing an exothermal reaction with the evolution of fume which comprises bringing together stannic chloride and an aqueous solution of ammonia.

5. The method of producing a controlled exothermal reaction with the evolution of fume which comprises bringing together stannic chloride and an aqueous solution of ammonia, the latter containing dissolved ammonium chloride.

6. In means for dispersing noxious material, a plurality of separate containers, compounds within said containers capable of spontaneous exothermal reaction with each other, means for retaining said containers in close proximity to each other so that mixture of the compounds will take place upon discharge thereof and means for introducing the noxious material into the admixed compounds.

7. In means for dispersing noxious material, a plurality of containers, compounds in certain of said containers capable of spontaneous exothermal reaction, noxious material in another of said containers, and means for retaining said containers in close proximity to each other whereby, upon discharge from said containers, admixture of the exothermally reacting compounds and of the noxious material will be effected.

8. In means for dispersing noxious material, a plurality of separate containers, stannous chloride in one of said containers, an aqueous solution of ammonia in another of said containers, means for retaining said containers in close proximity to each other so that mixture of said materials will take place on discharge thereof, and means for introducing the noxious material into the admixed compounds.

9. In means for dispersing noxious materials, a plurality of separate containers, stannous chloride in one of said containers, an aqueous solution of ammonia in another of said containers, one of said containers also containing a heat absorbing compound, means for retaining said containers in close proximity to each other so that mixture of said materials will take place on discharge thereof, and means for introducing the noxious material into the admixed compounds.

10. In means for dispersing noxious materials, a plurality of separate containers, stannous chloride in one of said containers, an aqueous solution of ammonia in another of said containers, one of said containers also containing ammonium chloride, means for retaining said containers in close proximity to each other so that mixture of said materials will take place on discharge thereof, and means for introducing the noxious material into the admixed compounds.

WINFORD LEE LEWIS.